United States Patent [19]
Harper

[11] Patent Number: 5,191,679
[45] Date of Patent: Mar. 9, 1993

[54] DISPLACEABLE HINGE

[76] Inventor: James B. Harper, Plaza Luna 1, Lomas Pueblo, Marbella, Malaga, Spain

[21] Appl. No.: 689,768
[22] PCT Filed: Nov. 16, 1989
[86] PCT No.: PCT/GB89/01358
§ 371 Date: May 20, 1991
§ 102e Date: May 20, 1991
[87] PCT Pub. No.: WO90/05473
PCT Pub. Date: May 31, 1990

[30] Foreign Application Priority Data
Nov. 18, 1988 [GB] United Kingdom ............... 8827063

[51] Int. Cl.$^5$ .................. F05D 7/00; A47K 1/09
[52] U.S. Cl. ................... 16/363; 248/311.2
[58] Field of Search ............ 16/362, 363, 364; 248/311.2, 312.1; 211/7; D7/620; 224/42.45 R

[56] References Cited
U.S. PATENT DOCUMENTS

| 185,543 | 12/1876 | Jones | 16/363 |
|---|---|---|---|
| 934,726 | 9/1909 | Henry | 16/363 |
| 5,014,956 | 5/1991 | Kayali | 248/311.2 |

FOREIGN PATENT DOCUMENTS 7514153  6/1976  Netherlands ............ 248/311.2

Primary Examiner—David Jones
Attorney, Agent, or Firm—Sughrue, Mion, Zinn, Macpeak & Seas

[57] ABSTRACT

A displaceable hinge (28), of particular use in a carrier (10) for a beverage container to allow use of the carrier (10) with different sizes of beverage container, comprises a first member (12) passing through an aperture in a second member (14), the first member being elongate to allow displacement of the second member relatively to the first member, at least one of the first and second members being resiliently deformable to allow pivoting of the second member relatively to the first member, and the aperture being bound by two side portions (30) located by opposite side faces (32) of the first member (12) and two end portions (34) located by opposite end faces (36) of the first member (12), the side portions (30) being offset from one another along the length of the first member and end protrusions (38) extending from the end portions (34) inwardly of the aperture also being offset from one another along the length of the first member, the side portions (30) and the end protrusions (38) being spaced in quadrature and being separated by a pair of intersecting channels (40) for receiving the first member (12) when the second member (14) is pivoted to lie either parallel to or perpendicularly to the first member (12).

6 Claims, 2 Drawing Sheets

DISPLACEABLE HINGE

The present invention relates to a displaceable hinge which is particularly, but not exclusively, suitable for use in a carrier for a beverage container of the kind disclosed in EP-A1-0176241, to which the reader is invited to refer.

It is usual for a carrier for a beverage container to include a body, a holder extending from the body to support an upper portion of the beverage container, and a base extending from the body below the holder to support a lower portion of the beverage container.

The body may be capable of being secured to a support. For example, there may be a tongue extending from the body above the holder and in the opposite direction to the holder and the base for mounting the body to a window ledge of a vehicle door. Alternatively, the body may be formed with a handle to be grasped by a user. The holder may be pivotally mounted to the body, about an axis extending laterally of the body, for movement between an operative outwardly extending position, in which the beverage container is received in an opening through the holder and is stood on the base, and an inoperative upwardly extending position for storage.

A disadvantage has been that the distance between the holder and the base has been pre-set so that the carrier has been capable of use only with certain sizes of beverage containers.

An object has therefore been to provide a displaceable hinge which, in its preferred application with a carrier for a beverage container, allows the distance between the holder and the base to be adjusted, yet allows the holder to be pivotally mounted to the body for movement between its operative and storage positions.

According to the present invention, a displaceable hinge comprises a first member passing through an aperture in a second member, the first member being elongate to allow displacement of the second member relatively to the first member, at least one of the first and second members being resiliently deformable to allow pivoting of the second member relatively to the first member, and the aperture being bounded by two side portions located by opposite side faces of the first member and two end portions located by opposite end faces of the first member, the side portions being offset from one another along the length of the first member and end protrusions extending from the end portions inwardly of the aperture also being offset from one another along the length of the first member, the side portions and the end protrusions being spaced in or generally in quadrature and being separated by a pair of intersecting channels for receiving the first member when the second member is pivoted to lie either parallel to or perpendicularly to the first member.

Preferably, the end protrusions result from forming the intersecting channels as concave grooves, but the intersecting channels could be flat and the end protrusions be formed as raised shoulders.

Also preferably, the side portions and the end protrusions are all formed to be of square or rectangular outline or cross-section.

A carrier for a beverage container, embodying a displaceable hinge according to the present invention, will now be described, by way of example only, with reference to the accompanying drawings in which.

Figure 1:
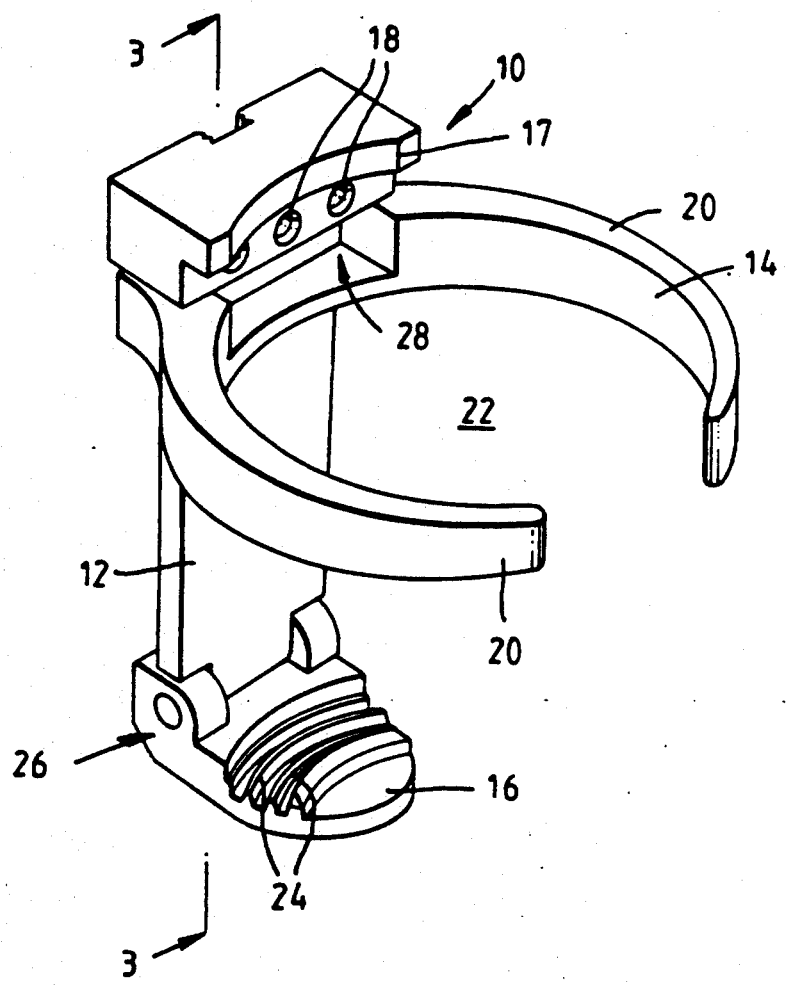
FIG. 1 is a perspective view of the carrier in its operative position.
Figure 2:
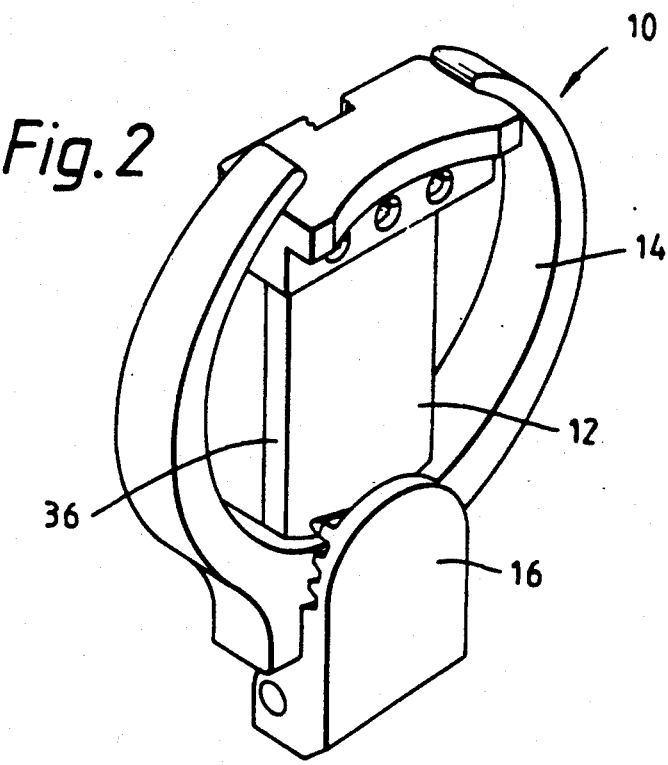
FIG. 2 is a perspective view of the carrier in its storage position.

The accompanying drawings show a carrier 10 including a body 12, a holder 14, a base 16 and a flange 17.

The body 12 is capable of being secured to a support, for example by the use of screws extending through bores 18. The holder 14 includes a pair of arms 20 defining an opening 22 therebetween which is capable of receiving an upper portion of a beverage container. The base 16 includes ridges 24 for use in locating, and therefore steadying, a rim formed at a lower portion of a beverage container. The flange 17 may be of the construction disclosed in the above-noted EP-A1-0176241 for enabling a plate of food to be carried by the carrier 10.

It should be appreciated that the beverage container is likely to be, but is not necessarily, a cardboard cup of generally frusto-conical shape.

It should further be appreciated that the base 16 is pivotally secured to the body 12 at non-displaceable hinge 26, and that the holder 14 is pivotally secured to the body 12 at displaceable hinge 28 forming the present invention.

The displaceable hinge 28 is displaceable along the body 12 and is located between the base 16 and the flange 17.

The displaceable hinge 28 comprises a first member (the body 12) passing through an aperture in a second member (the holder 14). The body 12 is elongate to allow displacement of the holder 14 therealong. At least one of the body 12 and the holder 14 is resiliently deformable to allow pivoting of the holder 14 relatively to the body 12. The resilient deformation may result partly from forming at least one and preferably both of the body 12 and the holder 14 of the carrier 10 of a plastics material and partly from forming the hinge 28 of the following construction.

Figure 3:
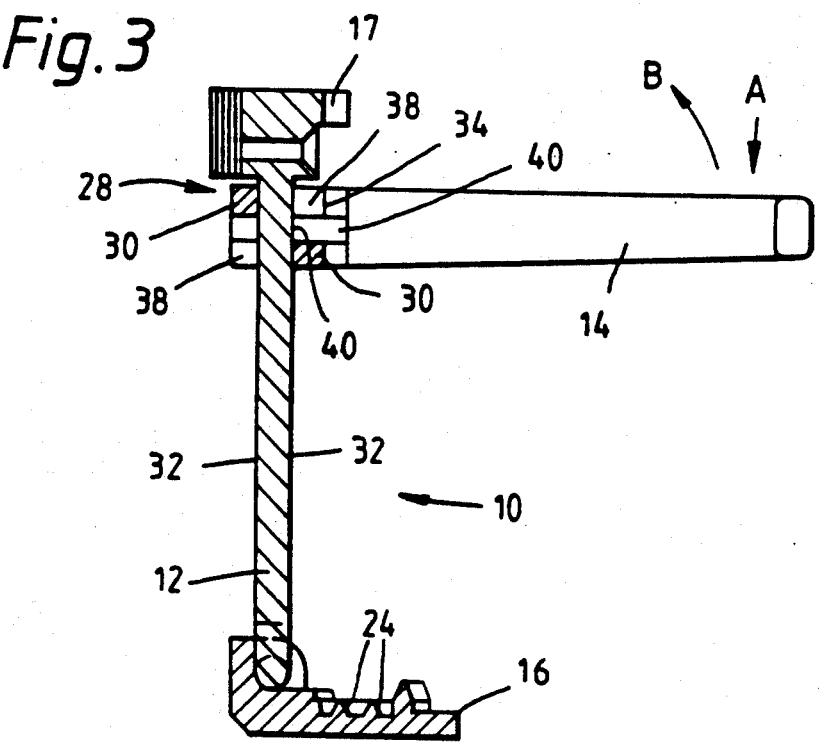
FIG. 3 is a longitudinal cross-section taken along the line 3—3 of FIG. 1.

The above-noted aperture is bounded, as shown most clearly in FIG. 3, by two side portions 30 located by opposite side faces 32 of the body 12 and two end portions 34 located by opposite end faces 36 of the body 12. The upper side portion 30, as shown in FIG. 3, need not extend continuously across the width of the adjacent side face 32 of the body 12, with the result that the aperture would not be closed but would open through a mouth. The side faces 32 may be flat whereas the end faces 36 may be convex. The side portions 30 are offset from one another along the length of the body 12 and end protrusions 38 extending from the end portions 34 inwardly of the aperture are also offset from one another along the length of the body 12. Indeed, the side portions 30 and the end protrusions 38 are spaced in quadrature and are separated by a pair of intersecting channels 40 which may be formed as concave grooves.

When the holder 14 lies perpendicularly to the body 12, the holder 14 is easily displaceable along the length of the body 12 until such time as a downward force is applied in the direction of the arrow A to the holder 14, whereupon as a result of a cantilever action the holder 14 becomes much more difficult to displace along the length of the body 12.

To pivot the holder 14 to its storage position, in the direction of the arrow B, it is necessary for the convex end faces 36 of the body 12 to be moved out of some of the concave grooves forming the channels 40, and past the end protrusions 38, until the convex end faces of the body 12 can snap into the concave grooves constituting the other channels 40.

I claim:

1. A displaceable hinge comprising:

an elongate first member having a pair of opposite side faces extending along its length and a pair of opposite end faces extending along its length;

a second member which has an aperture therethrough, said aperture being bounded by two side portions and two end portions, each of said end portions including a pair of intersecting channels, which separate ends of said pair of side portions from an end protrusion extending from a respective one of said end portions;

at least one of said first and second members being resiliently deformable;

said first member passing through said aperture in said second member such that said end faces of said first member are always in abutment with said end portions of said second member; and said second member being displaceable relatively to said first member along the length of said first member, and being pivotable relatively to said first member at any location selected at random along the length of said first member between a first position in which said second member lies perpendicularly to said first member and a second position in which said second member lies parallel to said first member;

wherein resilient deformation of at least one of said first and second members allows said end faces of said first member and said end protrusions of said second member to snap past one another during pivoting of said second member relative to said first member.

2. A displaceable hinge according to claim 1 wherein said intersecting channels comprise concave grooves.

3. A displaceable hinge according to claim 1 or claim 2, wherein said side portions and end protrusions are of square cross-section.

4. A displaceable hinge according to claim 1 or 2, wherein each of said first and second members is formed of a plastics material.

5. A displaceable hinge according to claim 1 or 2, in combination with a carrier for a beverage container, wherein said carrier has a body constituting said first member and has a holder constituting said second member, said holder including a pair of arms defining an opening therebetween.

6. A displaceable hinge according to claim 5, wherein said holder is displaceable along said body and is located between a base and a flange.

* * * * *